Nov. 14, 1950　　　F. R. McFARLAND　　　2,530,310
TRANSMISSION MECHANISM
Filed Feb. 26, 1945
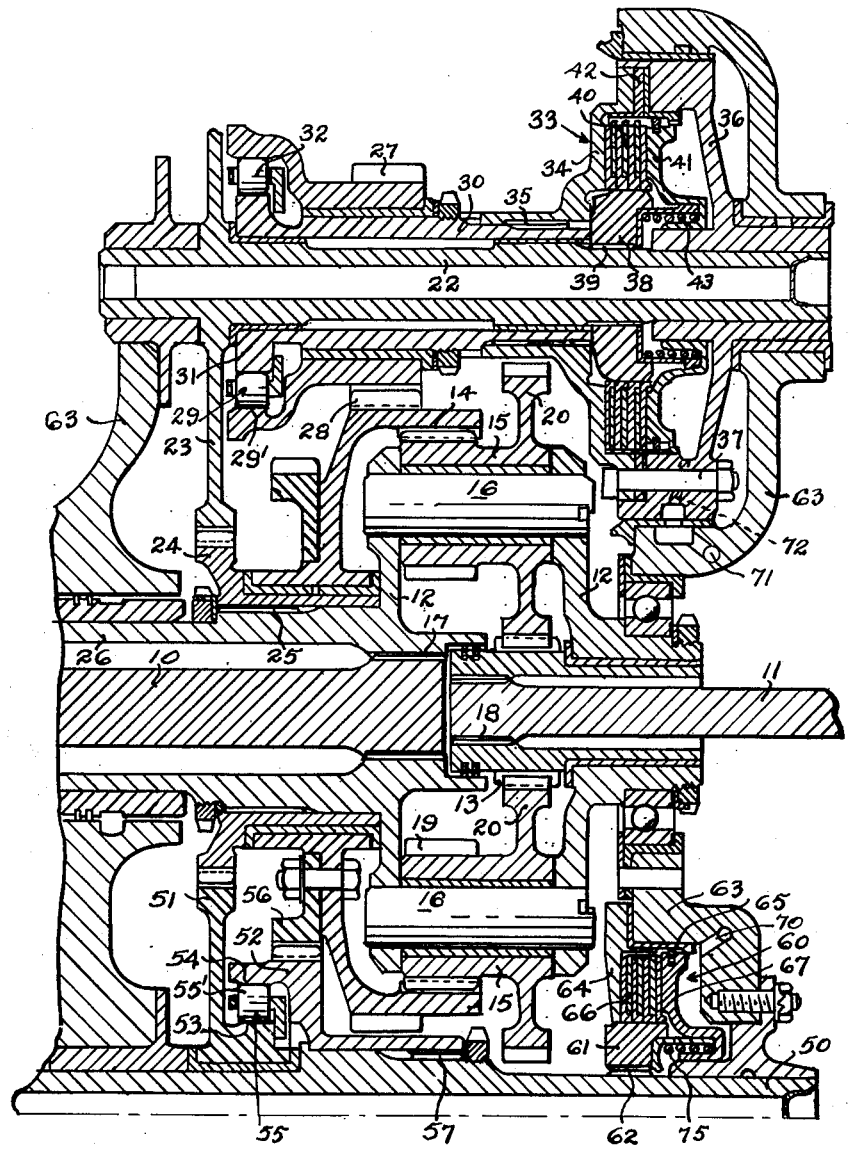
INVENTOR.
FOREST R. McFARLAND
BY
*Tibbetts & Hart*
ATTORNEYS Patented Nov. 14, 1950

2,530,310

UNITED STATES PATENT OFFICE 2,530,310

TRANSMISSION MECHANISM

Forest R. McFarland, Huntington Woods, Mich., assignor to Packard Motor Car Company, Detroit, Mich., a corporation of Michigan Application February 26, 1945, Serial No. 579,726

13 Claims. (Cl. 74—681)

This invention relates to transmission mechanism and more particularly to multiple speed geared drives.

Specifically the invention provides a step-up gearing as from the crankshaft of an internal combustion engine to the supercharger thereof. However, the mechanism lends itself to other purposes and is not to be limited in its application.

In mechanisms of this sort the driven shaft is run at very high speeds and it is desirable that at its highest speed there shall be the fewest possible gears in operation in the power transmission train. In the present invention the highest speed of the mechanism is obtained when the ring gear of the planetary gearing is held stationary, and the slower speeds are obtained by allowing the ring gear to rotate against the retarding action of other gearing.

It is one of the objects of the present invention to provide a speed step-up mechanism of the planetary type in which the ring gear of the mechanism is held stationary at the highest speed and is moved relatively slowly at the other speed or speeds.

Another object of the invention is to provide a transmission mechanism in which two shafts are geared together by planetary gearing controlled to provide three different speed ratios.

Another object of the invention is to provide a transmission mechanism with at least three different speed ratios without shifting gears into and out of mesh.

Another object of the invention is to provide a transmission mechanism having a plurality of driving speeds and control mechanism therefor operating through different combinations of clutches and brakes.

Another object of the invention is to provide a transmission mechanism having a single planetary gearing and geared connections thereto for controlling the planetary gearing to provide three definite speed ratios.

Another object of the invention is to provide a planetary gearing having a ring gear with geared connections controlling the ring gear to afford a number of different drive ratios.

Other objects of the invention will appear from the following description taken in connection with the drawing the single figure of which shows a sectional longitudinal view through a transmission mechanism incorporating the invention.

Referring to the drawing, drive shaft 10 is connected with a source of power and is in axial alignment with driven shaft 11. The shafts are geared together by planetary gearing including a carrier 12, sun gear 13, ring gear 14 and planet gear units 15 rotatably mounted on pins 16 fixed to the carrier. The carrier is splined at 17 to the drive shaft 10 and the sun gear is splined at 18 to the driven shaft 11. Each planet gear unit is comprised of two integral axially aligned gears 19 and 20, gears 19 meshing with the internal teeth of the ring gear 14 and gears 20 meshing with the sun gear 13.

It is the purpose of the invention to control the planetary gearing to provide a plurality of driving speeds from the drive shaft to the driven shaft. This result is obtained by differentially controlling or retarding the rotation of an element of the planetary gearing, preferably the ring gear. Two trains of gearing having different ratios and driven from the drive shaft are associated with the ring gear and are controlled to provide a selection of three driving speeds through the planetary gearing.

One of the gear trains includes a layshaft 22 extending parallel with the drive and driven shafts and having a gear 23 fixed thereto meshing with power gear 24 splined at 25 to sleeve 26 projecting from carrier 12. This gear train also includes gear 27 meshing with peripheral teeth 28 on ring gear 14 and having cam surfaces 29' forming part of a one-way clutch device 29. Sleeve 30 telescopes layshaft 22 and has one end 31 within the cam surfaces 29'. Rollers 32 are arranged between the cam surfaces 29' and end portion 31 of sleeve 30 and the cams are so arranged that the sleeve 30 may overrun the gear 27. Sleeve 30 and the layshaft 22 may be connected by a clutch device 33 shown as of the positive friction type. Clutch housing flange 34 is splined at 35 to sleeve 30 and is secured to another housing section 36 by bolts 37. Clutch hub 38 is splined at 39 to layshaft 22 and clutch plates 40 are alternately splined to the hub and sleeve 42 fixed between the clutch housing sections 34 and 36. Pressure piston 41 is located in the housing and is normally disengaged by coil spring 43. Drive through the gear train just described is made effective by engaging the clutch device 33 and the control of the ring gear 14 through this gear train provides an intermediate driving speed by retarding the tendency to forward rotation of the ring gear 14.

The other gear train includes layshaft 50 extending parallel with the drive and driven shafts. Gear 24 meshes with a gear 51 which is connected with a gear 52 by a one-way clutch 55. Gear 51 has cam surfaces 53 telescoped by a cylindrical flange 54 on gear 52 and rollers 55' are arranged between the cam surfaces and the flange. The cams are so arranged that the gear 51 may overrun the gear 52. Gear 52 meshes with a gear 56 fixed to and forming a part of ring gear 14 and is also splined to layshaft 50. The control of the ring gear through this gear train, gears 24, 51, 52, 56, provides the low speed drive by retarding the normally free rotation of the ring gear 14 to a lesser extent than when the gear train through layshaft 22 is used, as will be hereinafter explained.

High speed drive may be obtained by holding layshaft 50 stationary through means of a brake device 60. A brake hub 61 is splined at 62 to the layshaft 50 and is telescoped by a housing consisting of a portion of the transmission casing 63 having a wall member 64 and a slotted sleeve 65 fixed thereto. Brake plates 66 are alternately splined to the hub 61 and sleeve 65 and may be engaged by pressure piston 67 located in the brake housing. Spring 75 normally acts against piston 67 to disengage the brake device. When the brake device 60 is engaged shaft 50 will hold gears 52, 56 and 14 stationary and gear 51 will overrun gear 52 by reason of the one-way clutch connection 55.

Clutch device 33 and brake device 60 are arranged in chambers in the casing 63. The pressure pistons 41 and 67 are preferably moved to engaging position by fluid under pressure in a system connected with passages in the casing. Passage 70 of the system communicates with the brake device chamber so that fluid may actuate piston 67 to engage the brake plates. Passage 71 of the system communicates with passage 72 in the clutch housing member 36 so that fluid may actuate piston 41 to engage the clutch plates. Any form of hydraulic system and control valve mechanism may be employed to control fluid flow to the clutch and brake devices so that the desired driving speed through the planetary gearing may be selected.

The three geared speeds are obtained as follows:

Assuming that the drive shaft 10 rotates clockwise, looking from the left of the drawing, the carrier sleeve 26 and the gear 24 will turn with it since they are all splined together. Gears 23 and 51 will each be driven counterclockwise by gear 24, and since gear 23 is larger in diameter or has more teeth than gear 51 the former will be driven at a slower speed than the latter. These gears 23 and 51, through their connections, will act as brakes or retarding means on the gears 27 and 52 respectively to thereby control or determine the speed ratio of the transmission mechanism.

As the gearing is arranged the low speed drive will be obtained by having both the brake device 60 and the clutch device 33 released. This means that the layshaft 50 is free to rotate relative to the casing and the sleeve 30 is freed from the layshaft 22. By reason of the load on the driven shaft 11, that is its resistance to turning, there is a reaction through the gears 56 and 52 so that the gear 51 in its anticlockwise rotation will, through the one-way clutch device 55, hold the gear 52 to a limited anticlockwise rotation, and the gear 56, and consequently the ring gear 14, to a limited clockwise rotation. Since gear 51 is driven from the drive shaft faster than gear 23 the forward rotation of ring gear 14 is retarded less when the gear 51 is effective through one-way clutch 55 and gears 52 and 56 than when gear 23 is effective through its connections. With the clutch device 33 released, as above stated, the gear 51 is effective because disengagement of the clutch device 33 disconnects the drive between gear 23 and ring gear 14. True the mesh of gears 27 and 28 will drive the cam 29 of sleeve 30 but the sleeve will run idle since it is now freed from the layshaft 22.

A second or intermediate speed drive will be obtained by leaving the brake device 60 disengaged as with the first speed drive, but engaging the clutch device 33 so that the sleeve 30 will be connected to the layshaft 22. The load reaction now through the gears 28, 27 and the one-way clutch 29, the sleeve 30 and clutch device 33, to the layshaft 22 will, due to the difference in gearing, have more retarding effect on the ring gear 14 and the ring gear therefore will rotate in a clockwise direction at a lower speed than when operated through the gears 52, 56. The gear 51 will now overrun the gear 52, by reason of the one-way clutch 55 and the resulting drive to the driven shaft 11 will be at a somewhat higher speed than when the speed was controlled by the train of gears 51, 52, 56.

The higher speed is obtained by engaging the brake device 60 and leaving the clutch device 33 either engaged or disengaged. Engagement of the brake device 60 locks the layshaft 50 to the casing. This means that the gear 52 which is splined to the shaft 50 is also retained against rotation. The gear 51 now overruns the gear 52 by reason of the overrunning clutch 55 and the gear 52 prevents the gear 56 from rotating and this of course holds the ring gear 14 stationary also. In this way the control gearing has its greatest retarding effect upon the ring gear 14, actually retarding it to the zero point. The ring gear now has its maximum speed effect on the planetary gearing except as might be possible by rotating the ring gear in the reverse direction. It is immaterial whether the clutch device 33 is engaged or disengaged because in either event the gear 27 ceases to rotate and the overrunning clutch 29 permits overrun of the shaft 22 and/or sleeve 30.

At this high speed ratio of the mechanism only the planetary spider, the planet gears, the internal ring gear and the sun gear are involved in the power line and of these the ring gear is not rotating. Thus there is a minimum of gears in use at this higher speed, the other control gears coming into use only at the lower speeds.

It will be seen that the planetary gearing is always geared to the drive and driven shafts and the clockwise rotation of the ring gear is retarded by power means to select any one of the three driving speeds.

It will be understood that various forms of the invention other than that described above may be used without departing from the spirit or scope of the invention.

What is claimed is:

1. A transmission mechanism comprising a drive shaft, a driven shaft, planetary gearing between said shafts including an element normally rotating in the same direction as the drive shaft, two gear trains for differentially retarding rotation of said element, a positive clutch and an overrunning clutch in series in one of the speed gear trains, and means in the other speed gear train effective to brake the planetary gearing element.

2. A transmission mechanism comprising a drive shaft, a driven shaft, planetary gearing between said shafts including a controlled element normally rotated in the same direction as the drive shaft, a gear train driven from the drive shaft for retarding rotation of the element, an overrunning clutch in the gear train, and means for braking an element of the gear train between the overrunning clutch and the planetary gearing element.

3. A three speed transmission mechanism comprising a drive shaft, a driven shaft, planetary gearing between said shafts including an element normally driven in the same direction as the drive shaft, separate gear trains driven at different speeds for retarding rotation of said element, said trains each having an overrunning clutch therein, a positive clutch in one of the speed gear trains between the drive shaft and the overrunning clutch therein, and a brake in the other speed gear train between the overrunning clutch therein and the planetary gearing element.

4. A transmission mechanism comprising a drive shaft, a driven shaft, planetary gearing between said shafts including a ring gear driven in the same direction as the drive shaft, power means driven by the drive shaft including a layshaft and a clutch for retarding rotation of the ring gear, another power means driven by the drive shaft including a one-way clutch for retarding rotation to a lesser extent than the first mentioned power means, and means including a layshaft and a brake cooperating with a portion of second mentioned power means to further retard rotation of said ring gear.

5. In a transmission mechanism having a drive shaft, a driven shaft and planetary gearing between said shafts including a ring gear rotated in the same direction as the drive shaft, control means for the ring gear comprising a power gear driven from the drive shaft, a gear train driven by the drive gear and engaging the ring gear to retard rotation thereof, said train including an overrunning clutch and a clutch between the overrunning clutch and the power gear, a second gear train driven by the power gear and engaging the ring gear to retard rotation thereof, said second gear train including an overrunning clutch, and brake means operable to hold stationary a portion of the second gear train between the overrunning clutch and the ring gear.

6. In a transmission mechanism, a drive shaft, a driven shaft, planetary gearing between said shafts including a ring gear rotating in the same direction as the shafts, a gear train geared to the ring gear and driven from the drive shaft for retarding rotation of the ring gear, said gear train including a positive clutch device and an overrunning clutch between the positive clutch device and the ring gear, and brake controlled means for locking the ring gear against rotation the control of the ring gear being shiftable between the brake controlled means and the gear train when the positive clutch device is engaged by engaging or releasing the brake controlled means.

7. A transmission mechanism comprising a drive shaft, a driven shaft, planetary gearing between said shafts, including a ring gear normally rotated in the same direction as the drive shaft, power means having an element driven reversely from the drive shaft and a normally disengaged clutch and a one-way clutch operable to retard rotation of the ring gear when the normally disengaged clutch is engaged, and means including a normally disengaged brake and a one-way clutch for retarding ring gear rotation to a different extent than the first said means when the normally disengaged clutch and brake are disengaged and to lock the ring gear against rotation when said brake is engaged.

8. A transmission mechanism comprising a drive shaft, a driven shaft, planetary gearing between said shafts including a ring gear normally rotated in the same direction as the drive shaft, a power gear driven from the drive shaft, a gear train geared to the power gear and to the ring gear to provide a low speed drive, a brake for an element of said gear train to lock the ring gear against rotation to provide a higher speed drive, and another gear train geared to the power gear and to the ring gear including an overrunning clutch and a friction clutch for retarding rotation of said ring gear to a different extent than the first mentioned gear train to provide an intermediate speed drive.

9. In a transmission mechanism, the combination with drive and driven shafts, of a planetary gearing connecting said shafts and including a ring gear, brake means for locking said ring gear to provide a high speed drive for the driven shaft, and spaced selectively operable gear trains interposed between the drive shaft and the ring gear and including reversely operable one-way clutches and a friction clutch to drive the ring gear at varying speeds to provide lower speed ratio drives for the driven shaft when the brake means is released.

10. In a transmission mechanism, the combination with drive and driven shafts, of a planetary gearing connecting said shafts and having a planet carrier fixed to the drive shaft and a sun gear fixed to the driven shaft and including a controllable ring gear, selectively operable means including spaced lay shafts driven by the drive shaft to drive the ring gear to provide either of two geared speed drives for the driven shaft, and brake means for locking the ring gear to interrupt the drive of the ring gear through the geared means to provide a speed ratio drive for the driven shaft higher than either of the geared speed drives.

11. A transmission mechanism comprising a drive shaft, a driven shaft, planetary gearing between said shafts including a ring gear normally tending to rotate in the same direction as the drive shaft, two selectively operable gear trains driven from the drive shaft and having different gear ratios, each of said gear trains including a lay shaft geared to the ring gear to retard rotation of the ring gear to a different relative degree to vary the speed ratio drive from the drive shaft to the driven shaft, and a clutch for rendering one of said gear trains operable.

12. In a transmission mechanism the combination with drive and driven shafts, of a planetary gearing connecting said shafts and including a ring gear, a lay shaft geared to the drive shaft and to the ring gear to provide a low speed ratio drive, an overrunning clutch between said drive shaft and said ring gear, a second lay shaft geared to the drive shaft and to the ring gear and having a different speed ratio than said first mentioned lay shaft to provide an intermediate speed ratio drive between the drive shaft and the driven shaft, a friction clutch to engage said intermediate speed ratio drive, and separately operable brake means to lock the ring gear against rotation to provide a high speed ratio drive.

13. In combination, a drive shaft, a driven shaft, planetary gearing connecting said shafts and including a ring gear, brake means for locking the ring gear against rotation to produce a high speed step-up gearing for the driven shaft, two sets of different speed ratio gears driven by the drive shaft and operably connected to the ring gear for driving it in the forward direction to provide two selectively operable speed ratio drives for the driven shaft when the brake means is released, a clutch controlling one of said sets of gears, and one-way driving means associated with the other of said sets of gears, said clutch and one-way driving means each functioning to permit its associated set of gears to overrun when the drive is through the other of said sets of gears.

FOREST R. McFARLAND.

REFERENCES CITED

The following references are of record in the file of this patent:

UNITED STATES PATENTS

| Number | Name | Date |
| --- | --- | --- |
| 1,282,495 | Tornberg | Oct. 22, 1918 |
| 1,717,018 | Ferrari | June 11, 1929 |

FOREIGN PATENTS

| Number | Country | Date |
| --- | --- | --- |
| 144,349 | Great Britain | June 10, 1920 |